Figure 1:
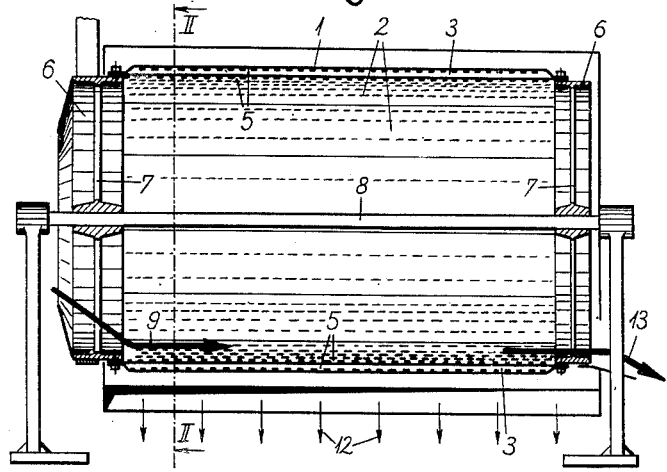

Sept. 1, 1953  J. MUSIL  2,650,704
APPARATUS FOR THE SELECTION OF SEEDS
OR SIMILAR MATERIAL
Filed Feb. 21, 1950  2 Sheets-Sheet 1

INVENTOR
JOSEF MUSIL
By: Haseltine, Lake & Co.
AGENTS

Patented Sept. 1, 1953

2,650,704

UNITED STATES PATENT OFFICE 2,650,704

APPARATUS FOR THE SELECTION OF SEEDS OR SIMILAR MATERIAL

Josef Musil, Vienna, Austria, assignor to Maschinenfabrik Heid Aktiengesellschaft, Vienna, Austria, an Austrian joint-stock company Application February 21, 1950, Serial No. 145,345
In Austria February 19, 1949

14 Claims. (Cl. 209—95)

The invention relates to a device for the selection of seeds or similar material, using unperforated cylinders provided with selecting cells.

It is already known for the selection of seeds to use rotating perforated drums partly surrounded by an unperforated fixed casing, whereby the weed seeds or the like are radially thrown out of the holes of the drum by the action of centrifugal force at a spot of the drum not covered by the casing. The customary sorters are, however, different from this construction showing, instead of the perforated drum, an unperforated cylinder with pocket-like selecting cells co-operating with collecting troughs. These sorters are operated in such a manner that the components of the granular material, e. g. grain or weed seeds, are carried off by a worm conveyor in the axial direction of the cylinder, however, separated from one another, on the one hand, axially on the casing of the cylinder, and on the other hand in the collecting trough provided axially in the cylinder. A drawback thereby is above all the required attendance of these sorters, especially for the correct adjustment of the trough, in order to attain a faultless separation or purification of the material, since the selecting procedure cannot be observed. The correct operation of the sorter depends on the person attending said sorter, or on the adjustment of the collecting trough brought about by said person. These sorters have, furthermore, the drawback of requiring, in consequence of the low speed of the passage of the material to be selected through the cylinder, after the supply has been shut off, a long time for being completely emptied, whereby there cannot, however, be checked, whether the last grain of the material to be selected has actually been discharged. The invention concerns an essential improvement of this known selecting process, and of the seed selecting machines, respectively, whereby the manner of operation, as well as likewise the device therefor are simplified, and a better efficiency than has hitherto been possible is attained.

The invention essentially consists in that for the selection of seeds or similar material, using an unperforated cylinder provided with selecting cells, the material taken up by the cells, e. g. wheat, weed seeds, is thrown out in tangential direction at several spots of the circumference of the cylinder.

The selecting process according to the invention proceeds completely automatically, i. e. without necessitating adjusting or attending manipulations, which have been required with the hitherto used sorters, after the same have started functioning. The collecting trough and the worm conveyor are omitted, since the discharge of the material taken up by the cells is brought about tangentially rather than axially from the cylinder. The rest of the material may in known manner be discharged in axial direction along the inside surface of the cylinder. Said rest may, however, also be discharged in tangential direction in accordance with the invention, by e. g. providing one part of the cylinder before the outlet with scooping means, like big cells, pockets, borders, said means lifting the material and discharging it in tangential direction.

According to a suitable embodiment of the invention the selecting cylinder is formed by parts arranged shutter-like one behind the other so as to form a cylinder, leaving free slits between said parts for a tangential discharge of the material. A discharge through the slits of the material placed in the cylinder does not ensue either during a standstill of the cylinder, or during the rotation of the same, this being prevented by the roof-like parts overlapping the slits. The grains lifted by the cells of the wall of the cylinder are falling out of the cells due to their proper weight, being by their proper speed cast against the downwards rotating part of the wall of the cylinder, wherefrom they are discharged through the next following slit coming up. The grains lifted up may thus freely leave, as if the half of the casing in the downwards rotating part of the cylinder did not exist at all, and as if the grains would practically come out unhindered. By the steps on the inside surface of the cylinder formed at the slits there is likewise attained an intimate mixture of the material steadily falling down over said steps during the rotation. The shutter-like parts may be adjustably arranged, whereby the size of the slits at the circumference of the cylinder, the position of the discharge zones for the grains lifted by the selecting cells, and likewise the number of rotations of the cylinder may be varied. If the longitudinal slits are increased, the grains placed in the cells are discharged at the vertex point only, or behind the same, while with contracted slits those grains fall out of the selecting cells at an earlier time. By thus influencing the position of the discharge zone there is now given the possibility of decreasing the number of revolutions of the selecting machine, and yet transferring the discharge zone e. g. as far as the vertex point of the cylinder. Thereby a more accurate separation of the material to be selected is attained. The possibility of decreasing the number of revolutions is preferable for the purification of some kinds of seeds, in which case with a small number of revolutions especially good purification results may be expected.

If several kinds of seeds, short-sized or long-sized grains or weed-seeds, are to be selected in one working operation, there is first separated one of these components, and by a further selecting procedure the second one of the remaining components, by conveying the tangentially thrown out material, e. g. wheat and weed-seeds, selected from the mixture, to a further cylinder, wherefrom the selected portion of the material, e. g. weed-seeds, is likewise again thrown out in tangential direction at several spots of the circumference of said further cylinder. An embodiment of a seed selecting machine of this kind may comprise two co-axially arranged shutter-like cylinders, between which an enveloping casing may be arranged for conveying the material tangentially discharged from the internal cylinder to the external one. This construction is only enabled by the mentioned omission of the collecting troughs inside the cylinder, and involves the further advantage that the material may be poured along the whole effective length of the external cylinder. This manner of supplying the material is not only applicable with double cylinders, where a selected portion of the material is conveyed from the internal cylinder to the external one, but even for pouring all of the material into a single cylinder, if bigger cells or similar scooping means are used. According to the invention the material may thus be conveyed to an internal cylinder, from which either all of said material or only a selected portion of the same is thrown out in tangential direction into an external selecting cylinder at several spots of the circumference of said internal cylinder, which is suitably likewise operating by means of a tangential discharge. The material is supplied to the empty cells of the external cylinder essentially over the entire efficient length of said cylinder, before reaching the foot of the kidney which forms by the material during the rotation. Thereby a considerably better efficiency than was hitherto possible is attained, since not utilized cells are employed for the selecting procedure, said cells separating continually the grains to be selected from the material supplied. This may likewise be attained in such a manner that the internal one of both cylinders is rotating in a reverse direction of rotation with regard to that of the external cylinder, whereby the enveloping casing for guiding over the material tangentially discharged from the internal cylinder may be omitted.

The seed selecting machine according to the invention has still further essential advantages. It may be in a swift way completely emptied, by being turned back, contrary to the selecting direction of rotation, by one or by a few rotations, whereby the material remaining in the cylinder flows out through the slits of said cylinder. Furthermore, the material is not discharged, contrary to the axial discharge of the trough, in a narrow current, but uniformly over the entire length of the cylinder, so that it may be more easily surveyed for examination purposes. Moreover, the manufacture of the selecting cylinder comprising several parts is more advantageous, since those parts may be treated in an easier and hardened in a better way than a one-part cylinder, and may likewise be dismountably arranged, whereby only the cleaning of the cylinder practically becomes possible, and the hitherto usual demounting for this purpose becomes superfluous. By demounting one or several parts of the cylinder also the emptying procedure may be supervised.

Figure 2:
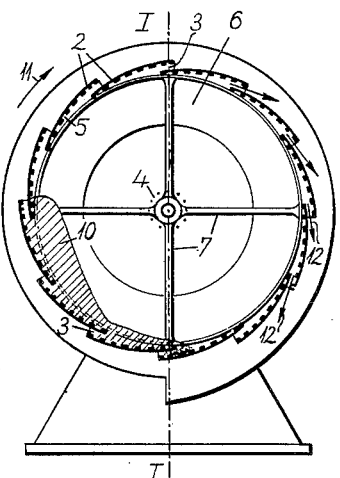
Figure 4:
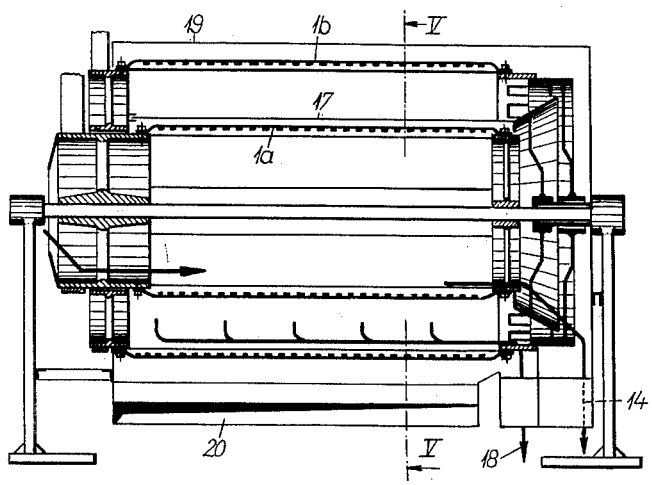
Figure 3:
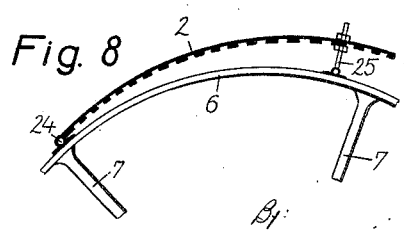

Embodiments of the seed selecting machine according to the invention are schematically shown, by way of example, in the drawing, in which Fig. 1 is a sorter in longitudinal section according to line I—I of Fig. 2, and Fig. 2 a sorter in cross section according to line II—II of Fig. 1; Fig. 3 illustrates diagrammatically an embodiment of a cylinder for the tangential discharge of the entire material; Fig. 4 is a further embodiment of the sorter in longitudinal section according to line IV—IV of Fig. 5, and Fig. 5 in cross section according to line V—V of Fig. 4; Fig. 6 shows a detail in cross section in connection with the supply of the material to the selecting cylinder, and Fig. 7 a cross section of a modified embodiment similar to Fig. 5, and Fig. 8 a detail showing the adjustable arrangement of the parts of the wall of the cylinder. In the longitudinal sections according to Figs. 1 and 4 the selecting cells, which would be otherwise visible in the drawings, have not been shown for the sake of greater clearness.

Like reference characters denote like parts in the several figures of the drawings.

The cylinder 1 of the sorter (Figs. 1, 2) is formed by a plurality of longitudinally extending arcuate members or longitudinal parts 2 bent so as to form a cylinder, and overlapping one another shutter-like, whereby each of the members or parts 2 is eccentrically arranged relative to the axis of the cylinder to provide the axially extending elongate apertures or slits 3. The center of curvature of these parts 2 of the wall of the cylinder lie along a circular line 4 indicated by a dotted line, and concentrically surround the center of the cylinder. The parts 2 of the wall are provided with pocket-like selecting cells 5. Said parts 2 are suitably dismountably fastened with their front ends on rings 6 supported by arms 7 upon shaft 8, and running idle upon said shaft. The drive of said shaft is brought about by one of both rings 6, shaped for this purpose as a pulley.

The parts 2 of the wall may be adjustable for altering their inclined position, so that the discharge zone may be varied by the selecting cells directed upwards in a more or less inclined manner, as shown in Fig. 8, in which a part 2 is connected by joints 24 with the discs 5, 6, said part being adjustable by means of the screw 25.

The material is axially poured in the direction of the arrow 9 into the rotating substantially horizontal cylinder 1, and being axially moved forward in said cylinder by the pressure of the following material, whereby said material rolls off along the wall of the cylinder, in consequence of the rotation of said cylinder, in the shape of a kidney 10 (Fig. 2), and will not be discharged, either during the rotation, or during the standstill, through the slits 3 in the ascending part of the cylinder, in consequence of the shutter sheets overlapping one another. The direction of rotation of the cylinder is indicated by the arrow 11. The material, e. g. short-sized grains or weed-seeds, taken along by the selecting cells 5 is discharged in the tangential direction indicated by arrows 12 through the slits 3 over the entire descending half of the cylinder. By the fact that selecting cells are likewise arranged upon the overlapping parts of the wall of the cylinder, said cells are, in consequence of the natural angle of slope of the material to be selected, covered by said material. The discharge of the material, e. g. long-sized grains, travelling axially in the cylinder, ensues at the end of the cylinder in the direction of the arrow 13. The material axially travelling on may, however, as shown in Fig. 3, be likewise discharged tangentially, in which case a part 1c of the cylinder 1 is provided with scooping means, e. g. the borders or lifting baffles 21, said means lifting the material conveyed to the part 1c of the cylinder, and tangentially discharging said material through the slits 3. In Fig. 3 there are also shown upon one part of the cylinder the selecting cells 5, and the tangential discharge of the short-sized grains taken along by said cells, besides the long-sized grains lifted by the borders 21.

Figure 5:
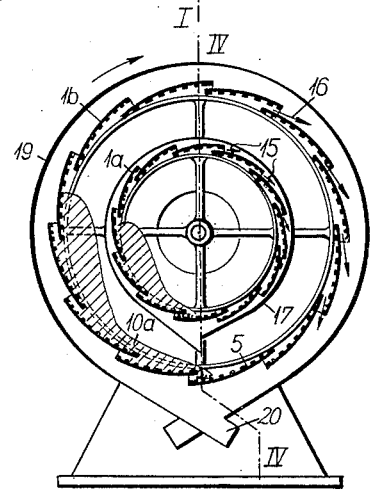
Figure 6:
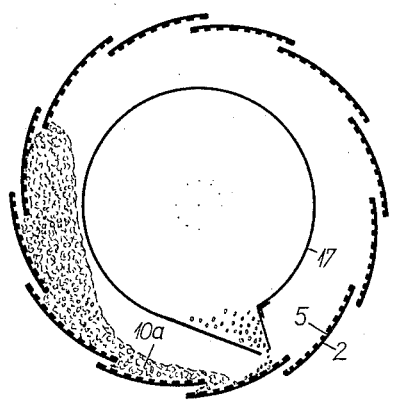
Figure 3:
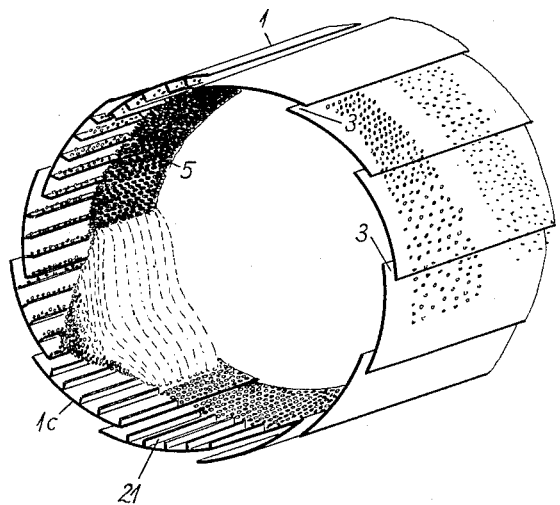

According to Figs. 4 and 5 two sorters of the construction according to Figs. 1, 2 are co-axially arranged, for separating three components of a mixture. The material supplied to the internal cylinder 1a travels in an axial direction through the same, its portion of long-sized grains being discharged in the direction of the arrow 14 (Fig. 4). The material, e. g. wheat and weed-seeds, tangentially discharged in the direction of the arrows 15 (Fig. 5), is collected by the stationary enveloping casing 17, and conveyed to the external cylinder 1b of the sorter, where the separation or purification of the grains is again brought about in similar manner, whereby e. g. the weed-seeds are tangentially discharged in the direction of the arrows 16 (Fig. 5), and supplied through the stationary enveloping casing 19 to the discharge 20, the wheat being, on the contrary, axially guided off in the direction of the arrow 18 (Fig. 4). The supply of the grains from the enveloping casing 17 into the external cylinder 1b of the sorter ensues over the entire efficient length of said cylinder, i. e. the entire length provided with cells, before said grains reach the foot 10a of the kidney, into the empty cylinder, so that the grains may be taken up by the empty cells 5. In Fig. 6 there are shown parts of the external cylinder and of the enveloping casing 17 at a greater scale. This manner of supplying the grains over the entire length of the cylinder with co-axial double cylinders may naturally likewise be employed with a cylinder of a sorter according to Figs. 1, 2, whereby the material is not poured into the selecting cylinder in the direction of the arrow 9, but is filled into an internal cylinder, similar to the cylinder 1a of Figs. 4, 5 showing, however, bigger cells or scooping means, e. g. borders 21, according to Fig. 3, in order to discharge tangentially through the slits 3 the entire material filled into the cylinder. The material is then, according to the illustration of Fig. 6, conveyed by the enveloping casing 17 to the empty selecting cells 5 of the external cylinder over the entire length of said external cylinder provided with selecting cells.

Figure 7:
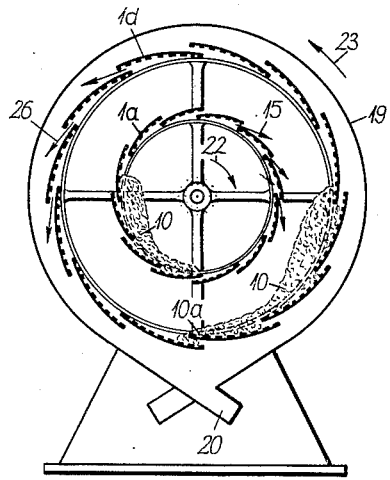

The enveloping casing 17 may, however, also be omitted when using the co-axial arrangement. Such an embodiment is shown in Fig. 7, according to which two cylinders 1a and 1d of a construction according to Figs. 1, 2 are co-axially arranged, but for a reverse direction of rotation. The cylinder 1a is rotating in the direction of the arrow 22, and the external cylinder 1d in the direction of the arrow 23. The kidney 10 formed by grains is therefore likewise rolling off on opposite sides in both cylinders. The material tangentially discharged from the internal cylinder 1a in the direction of the arrow 15 is thereby discharged partly directly upon the kidney 10 rolling off in the cylinder 1d, partly, before reaching the foot 10a of the kidney, into the cells of the empty cylinder. The lifted grains are discharged in the direction of the arrows 26 into the enveloping casing 19, leaving the same through the discharge 20. This embodiment may be naturally used in similar manner for conveying the material to be selected into a cylinder of a sorter according to Figs. 1 and 2, the internal feeding cylinder being likewise rotating in reverse direction with regard to the external cylinder.

The apparatus according to the invention is not only applicable for the selection of corn grains aand weed-seeds, but also for other sorts of grains, like legumes, berries or the like.

The invention is not limited to any special cross sectional form of the cylinder, which may also be polygonal, e. g. with flat parts of the wall of the cylinder. It may further be noted that the removable arrangement of the parts of the wall of the cylinder results in the further advantage that these parts may be changed for parts with cells of other dimensions, where it is intended to purify other kinds of the material. This change may be effected in a short time, since it is not necessary to dismount the apparatus for this purpose.

While the invention has been shown in the particular embodiments described it is not limited thereto, as modifications thereof may be made without departing from the scope of the appended claims.

I claim:

1. In an apparatus for the selection of seeds or similar material the combination comprising frame means, a drum mounted in the frame means for rotation in both directions and receiving the material at one end and discharging a part of said material at the other end, said drum having on its interior surface material selecting cells and including peripheral wall means having a plurality of pairs of radially spaced edges substantially overlapping in a direction tangential of the drum periphery and defining an aperture extending tangentially of the circumference of the drum and opening from the interior of the drum to the exterior thereof, and means for rotating said drum to discharge the material selected by said cells tangentially from said drum through said apertures to the exterior of the drum, the material not selected by said cells being caused during rotation of the drum in said selecting direction to fill said apertures without being discharged through said apertures to the exterior of the drum, whereas rotation of the cylinder in the opposite of said direction will cause the material in the drum rapidly to flow out through said apertures to the exterior of the drum.

2. The apparatus according to claim 1, and wherein an inner drum is co-axially arranged in said drum, said inner drum having on its interior surface material scooping cells and including peripheral wall means having a plurality of pairs of radially spaced edges substantially overlapping in a direction tangential of the drum periphery and defining an aperture extending tangentially of the circumference of the drum and opening from the interior of the drum to the exterior thereof, and means for rotating said inner drum to discharge the material received by said cells tangentially from said inner drum through its apertures into said co-axially arranged outer drum.

3. The apparatus according to claim 1, and wherein an inner drum is co-axially arranged in said drum, said inner drum being of the same structure as said outer drum, and a material collecting means between said inner and outer drums for receiving the material discharged through the apertures of said inner drum, and means discharging material from said collecting means into said outer drum.

4. The structure set forth in claim 3, wherein the means for discharging the material from said collecting means into said outer drum are adapted to supply said material over substantially the whole effective length of said drum to the empty cells thereof lying in front of the material banking in the drum during the rotation thereof.

5. The apparatus according to claim 1, and wherein an inner drum is co-axially arranged in said drum said inner drum being of the same structure as said outer drum, said peripheral wall means of the inner and outer drums, respectively, being reversely overlapped, and means for rotating said outer drum in a direction opposite to the direction of said inner drum to discharge the material selected by said cells on the interior surface of the inner cylinder through the apertures therein and into said outer drum.

6. In an apparatus for the selection of seeds or similar material, the combination comprising frame means, a substantially horizontally disposed drum rotatably mounted in the frame means and receiving material at one end and discharging a part of said material at the opposite end, the drum including a plurality of imperforate, longitudinally extending, peripheral, arcuate wall members, each having on its inner surface material selecting cells, the members having adjacent, radially spaced edges overlapping substantially in tangential direction of the circumference of the drum and opening from the interior of the drum to the exterior thereof, and means for rotating said drum to discharge the material selected by said cells tangentially from said drum through said apertures to the exterior of the drum, the material not selected by said cells being caused during rotation of the drum in said selecting direction to fill said apertures without being discharged through said apertures to the exterior of the drum, whereas rotation of the drum in the opposite of said direction will cause the material rapidly to flow out through said apertures to the exterior of the drum.

7. The apparatus according to claim 6, comprising operable means for adjusting the spacing of the overlapping wall edge portions, whereby the selection of the material may be varied.

8. The apparatus according to claim 6, and wherein the drum includes end members, and each of the longitudinally extending wall members is pivotally connected at one of its longitudinal edges to the end members and the other longitudinal edge of its wall members is in circumferentially overlapping and radially spaced relation to one of said longitudinal edges of an adjacent wall member, and also comprising means carried by an end member and connected to a wall member and operable to adjust the spacing of the overlapping members, whereby the selection of material may be varied.

9. The apparatus according to claim 6, and wherein the wall members are eccentrically arranged with respect to the drum axis.

10. The structure set forth in claim 6, including scooping means on said arcuate members at the discharge end of said drum for also discharging the not selected part of said material tangentially from said drum through said apertures.

11. The apparatus according to claim 6, and wherein at least one of the wall members is removably connected to the remaining parts of the drum.

12. The structure set forth in claim 6, wherein the said overlapping portions are provided on their inner surface with selecting cells.

13. In an apparatus for the selection of seeds or similar material, a rotatable substantially horizontal drum having means for receiving material therein at one end thereof, means discharging a part of said material at the other end of said drum, said drum comprising a plurality of circumferentially overlapping imperforate longitudinally extending arcuate members each having material selecting cells on the inner surface thereof, each of said arcuate members being eccentrically arranged relative to the axis of said drum, the eccentric arrangement of said arcuate members providing elongate aperture means in said drum extending substantially throughout the entire length thereof, and means for rotating said cylinder to discharge the material selected by said cells tangentially from said drum through said aperture means, scooping means on said arcuate members at the discharge end of said drum for also discharging said part of said material tangentially from said cylinder through said aperture means.

14. In an apparatus for the selection of seeds or similar material, a rotatable substantially horizontal drum having means for receiving material therein at one end thereof, means discharging a part of said material at the other end of said drum, said drum comprising a plurality of circumferentially overlapping imperforate longitudinally extending arcuate members each having material selecting cells on the inner surface thereof, each of said arcuate members being eccentrically arranged relative to the axis of said drum, the eccentric arrangement of said arcuate members providing elongate aperture means in said drum extending substantially throughout the entire length thereof, and means for rotating said drum to discharge the material selected by said cells tangentially from said drum through said aperture means, said drum comprising annular end members and said imperforate members each being pivotally connected at one of the longitudinally extending edges thereof to said end members, the other longitudinally extending edge portion of each of said imperforate members circumferentially overlapping said one of the longitudinally extending edges of an adjacent imperforate member, and means carried by said end members and connected to said imperforate members for adjusting the space between the overlapping portions of said imperforate members whereby the selection of material may be varied.

JOSEF MUSIL.

References Cited in the file of this patent

UNITED STATES PATENTS

| Number | Name | Date |
|---|---|---|
| 188,776 | Butger | Mar. 27, 1877 |
| 917,339 | Mobus | Apr. 6, 1909 |
| 1,912,375 | Johnson | June 6, 1933 |

FOREIGN PATENTS

| Number | Country | Date |
|---|---|---|
| 7,787 | Great Britain | May 28, 1888 |
| 515,630 | Germany | Jan. 8, 1931 |